United States Patent [19]

Clapp et al.

[11] 4,241,171

[45] Dec. 23, 1980

[54] HARDENER IN CARRIER LAYER

[75] Inventors: Roger C. Clapp, Wellesley; Edward J. Choinski, Wayland, both of Mass.

[73] Assignee: Polaroid Corporation, Cambridge, Mass.

[21] Appl. No.: 13,160

[22] Filed: Feb. 21, 1979

[51] Int. Cl.³ .......................... G03C 1/78; G03C 1/30; G03C 1/76; A21D 4/00

[52] U.S. Cl. .................................... 430/539; 427/333; 430/523; 430/621; 430/935

[58] Field of Search ............... 427/333; 96/111, 87 R, 96/76 R, 77, 67, 119 R; 430/523, 539, 621, 935

[56] References Cited

U.S. PATENT DOCUMENTS

| | | | |
|---|---|---|---|
| 2,591,542 | 4/1952 | Harriman et al. | 96/111 |
| 2,962,377 | 11/1960 | Land | 96/29 R |
| 3,427,158 | 2/1969 | Carlson et al. | 96/76 R |
| 3,586,503 | 6/1971 | Taylor | 96/77 |
| 3,762,927 | 10/1973 | Haas | 96/111 |
| 4,113,903 | 9/1978 | Choinski | 427/420 |
| 4,124,397 | 11/1978 | Abele et al. | 96/111 |

*Primary Examiner*—Richard L. Schilling

*Attorney, Agent, or Firm*—John W. Ericson

[57] ABSTRACT

A process for making a photographic product in which a plurality of liquid layers are coated on a base, comprising the steps of coating as the first layer adjacent the base a carrier layer containing a photographic hardener and coating as the second layer adjacent the first layer an isolation layer. The product is completed by coating a plurality of conventional photographic compositions over the first two layers and drying.

7 Claims, 2 Drawing Figures

HARDENER IN CARRIER LAYER

BACKGROUND OF THE INVENTION

Figure 1:
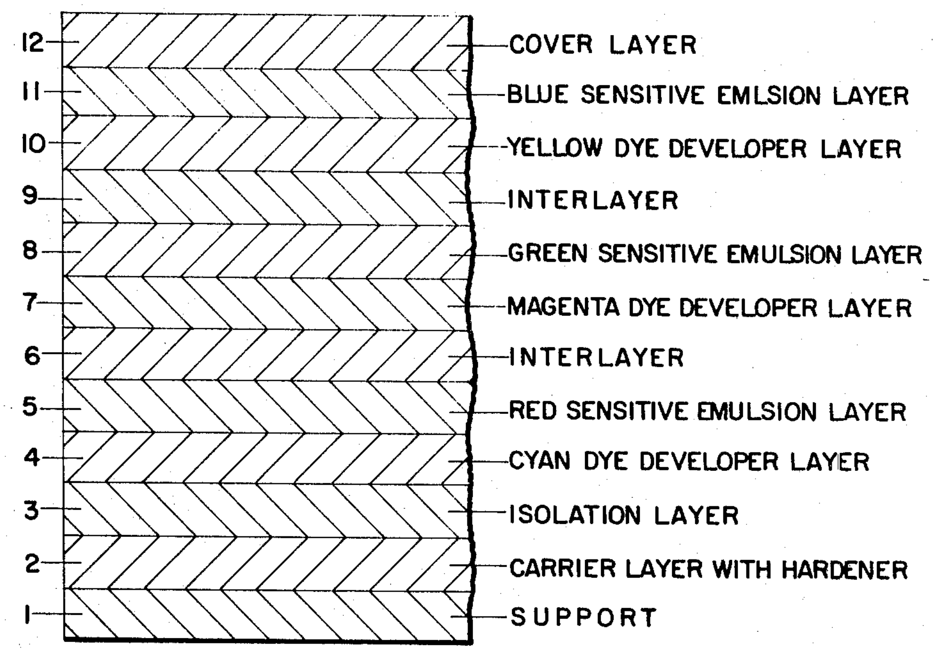

This application relates to the manufacture of photographic products, and particularly to the manufacture of photographic products with forehardened gelatin layers.

Photographic products containing gelatin or other cross-linkable polymers are conventionally hardened at one or more stages of manufacture and use to provide mechanical stability, to prevent softening and sticking, to provide abrasion resistance, or to modify the diffusion transfer characteristics of the product during processing. Typical hardeners and their functions are discussed in "The Hardening Of Gelatin And Emulsions" by Burness and Pouradier, appearing as Section III of Chapter 2 in *The Theory of the Photographic Process,* Fourth Edition, edited by T. H. James and published in 1977 by McMillan Publishing Company, Inc. of New York, New York. Generally speaking, photographic hardeners are water soluble materials which are effective under prescribed conditions to cross-link gelatin or other cross-linkable polymers that may be included in various layers of a photographic structure such as, for example, those described in U.S. Pat. No. 3,586,503, issued on June 22, 1971 to Lloyd D. Taylor and assigned to the assignee of this application.

For some purposes, the selected hardener can be added to a photographic composition, such as a photosensitive emulsion containing gelatin and silver halide, prior to coating, as described, for example, in U.S. Pat. No. 3,762,927, issued on Oct. 2, 1973 to Howard C. Haas and assigned to the assignee of this application. However, particularly in the case of photograhic products comprising multiple thin layers of coated materials for use in the production of photographic images by diffusion transfer processes, it has been found desirable to avoid the coating of compositions containing gelatin, or other cross-linkable polymeric constituents, and a hardener. To do so may result in undesired increases in the viscosity of the coating composition, or to mechanical instability in the gelatin-containing layers during coating.

Where it is desired to delay hardening of a gelatin-containing layer in a photographic product until during or after an image forming processing operation, various expedients have been proposed. For example, in U.S. Pat. No. 2,962,377, issued on Nov. 29, 1960 to Edwin H. Land and assigned to the assignee of this application, a processing composition containing a hardener is described that diffuses into a gelatin-containing layer during processing to effect hardening. Another approach is to include a hardener in a gelatin layer which is activated by an alklaine processing fluid, so that the principal hardening effect occurs after the processing fluid has been applied to the product. Of course, neither of these techniques is of use where forehardening is desired.

In U.S. Pat. No. 3,427,158, issued to David P. Carlson and Jerome L. Reid on Feb. 11, 1969 and assigned to the assignee of this application, photographic products and processes are described in which a hardener is included in an interlayer composition that does not contain gelatin, but does contain a polymeric latex that is inert in contact with the hardener. This latex composition is coated between layers containing gelatin, and serves in the finished product as a timing layer to delay certain diffusion transfer processes during image processing so that they occur after other processes. However, it has been found that inclusion of a hardener in the latex layer, while practicable and having been successfully used, may cause difficulties during coating because of undesirable interaction between the hardener and the gelatin at the interface between the timing layer and any adjacent gelatin-containing layers. Another problem is that the introduction of a hardener into the latex layer imposes undesired restrictions on both the composition and the pH of the latex layer, generally resulting in the need to coat at a pH out of the range in which the latex is most stable. The object of this invention is to facilitate the forehardening of gelatin and other cross-linkable polymers, while reducing the constraints on the coating process and on the chemistries of the various photosensitive, dye developer, timing and/or other layers that may be included in a given photographic product.

Briefly, the above and other objects of the invention are attained by the construction of a novel photographic product comprising as base sheet upon which there is coated a plurality of layers including a first carrier layer next to the base, an isolation layer over the carrier layer, and then one or more superposed layers comprising at least one layer containing gelatin or other cross-linkable (tannable) polymeric material. This product is made by coating the first layer as an aqueous composition containing a hardener and free of any polymeric constituent, such as gelatin, that will react with the hardener during coating. This layer may, however, include potentially cross-linkable constituents at concentrations low enough to inhibit cross-linking during coating. The isolation layer may simply be water, although diffusable constituents of a desired diffusion transfer system may be included if compatible with the hardener. Gelatin or other cross-linkable polymeric constituents that might interact with the hardener are preferably not included in this layer.

The invention will best be understood in the light of the following detailed description, together with the accompanying drawings.

Figure 2:
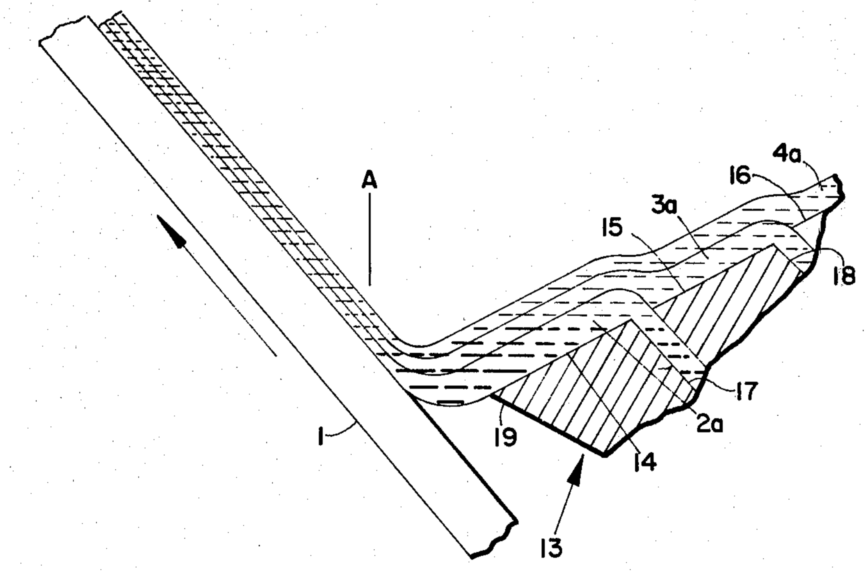

In the drawings;

FIG. 1 comprises a schematic, fragmentary cross-sectional sketch illustrating the construction of a photographic product in accordance with the invention; and FIG. 2 is a fragmentary schematic elevation sketch, with parts shown in cross section, illustrating coating apparatus and a coating process useful in the practice of the invention.

In FIG. 1, a photographic negative is illustrated which may be suitable for exposure and processing in the manner described in the above-cited U.S. Pat. No. 3,427,158. The negative comprises a support 1, of conventional polyester, acetate or other desired sheet material, on which are carried eleven successive layers 2 through 12. The layers 2 through 12 are preferably coated onto the support as wet dispersions or solutions, and then dried. The support 1 may be subcoated with gelatin, so long as the subcoating is dried before the carrier layer 2 is coated.

The carrier layer 2 may be made from a composition consisting of a solution in water of a diffusible hardener, such as succinaldehyde, glutaraldehyde, or other suitable conventional hardeners such as those described in the above-cited U.S. Pat. No. 3,427,158, which is incorporated herein by reference. In a presently preferred embodiment of the invention, the carrier layer includes a shear-thinning thickening agent compatible with the hardener, for the purposes described in U.S. Pat. No. 4,113,903, issued on Sept. 12, 1968 to Edward J. Choinski and assigned to the assignee of this application. However, the layer 2 should be substantially free of gelatin or other polymeric materials that would interact appreciably with the hardener during the coating operation. For example, aqueous compositions containing sodium cellulose sulfate cannot be coated at a pH below about 7. A pH reducing hardener such as succinaldehyde can be included in such a composition if the pH is raised as with a strong base such as NaOH, or, preferably, with a base having a buffering action, such as triethanol amine.

The isolation layer 3 may be laid down as a thin coat of water, and as such would essentially disappear during the process of drying the coated product. This layer may serve as a vehicle for laying down a non-interacting polymer for the purpose of adjusting the rheology of the system, but it should be free of gelatin or other hardenable polymers. The primary purpose of the isolation layer is to serve as a diffusion impedance to the transfer of hardeners to the supervening layers during the process of coating on the support before the coated layers have become stationary relative to the support.

The layers 4–12 may be of conventional compositions, comprising liquids containing conventional photographic constituents and a major proportion of a volatile solvent. The solvent is usually water, although other solvents in which the hardener is soluble and diffusible may be employed. For example, the compositions described in the above-cited U.S. Pat. No. 3,427,158 may be used, except that no hardener is included in the coating compositions from which these layers are made. As shown, these layers comprise a three color subtractive system including a transparent cover layer 12 and a blue sensitive silver halide emulsion layer 11 adjacent the cover layer. A yellow dye developer layer 10 is next adjacent the blue sensitive layer. An interlayer 9 separates the layer 10 from a green sensitive silver halide emulsion layer 8. There is a magenta dye developer layer 7 adjacent the layer 8. An interlayer 6 separates the layer 7 from a red sensitive emulsion layer 5. A cyan dye developer layer 4 separates the layer 5 from the isolation layer 3.

All of the silver halide emuslion layers 5, 8 and 11, the dye developer layers 4, 7 and 10, and the cover layer 12, contain gelatin. As noted in U.S. Pat. No. 3,427,158, the interlayers 6 and 9 contain polymers which time the diffusion of constituents of the several layers and the processing composition, together with the products of the process of forming and transferring an image to a receiving sheet. While these polymers are nominally inert to a gelatin hardener, they are apt to agglomerate or precipitate if present with the hardener during the coating process, unless undesirable constraints on concentration and pH are imposed. There is also the possibility, precluded by the process of this invention, that a hardener in an interlayer such as 13 might react with gelatin in any adjacent layers such as 12 or 14, at the interfaces between the layers, to cause hydrodynamic instability during coating.

FIG. 2 illustrates a portion of the process of making a product such as that shown in FIG. 1. Such products may be made by coating a moving web comprising the support 1 of FIG. 1 with a multiple layer cascade slide applicator, fragmentarily shown at 13 in FIG. 2. An applicator of this kind comprises a series of inclined slides such as 14, 15 and 16 down which layers of the coating compositions such as 2*a*, 3*a* and 4*a*, for preparing the layers such as 2, 3 and 4, respectively, flow by gravity in superposed layers in laminar flow. The coating compositions are supplied to the slide surfaces in a conventional manner through coating slots such as 17 and 18.

As suggested in FIG. 2, the coating compositions flow down over the lip 19 at the base of the lowermost slide 14 and form a multilayer bead that is entrained by and drawn down on the support 1. The entrained layers rather quickly reach a stable reduced thickness on the support 1, beyond which point, indicated at A in FIG. 2, they are stationary relative to the moving support. The portion of the process during which hydrodynamic instability is of concern is the journey of the coating compositions down the applicator slides and their draw-down on the web prior to point A.

When the carrier layer 2 is formed by a composition 2*a* that contains the hardener but no gelatin, and the composition 3*a* from which the isolation layer 3 is formed initially contains no hardener and no gelatin, there is very little opportunity for interaction between the hardener and the gelatin in any supervening layer such as 4*a*, from which the gelatin containing layer 4 is formed. As indicated in FIG. 2, the only opportunity for undesired interaction by diffusion transfer of the hardener is from the point at which the composition 2*a* is supplied to the last slide 14, and a point at which the liquid layers have been drawn down to their final thickness and are stationary relative to the web. This is a very short distance traversed by the liquids in, typically, far less than one second. Most of the distance involved is over the length of the last slide 16, where the liquids are relatively deep compared to their depth on the support beyond point A. Thus, the path length for diffusion is long. Moreover, it is known that gelatin hardens much less rapidly in relatively dilute solutions, such as those used in coating, than in the much more concentrated form produced during the drying process. Thus, the process of the invention prevents any effective contact between the hardener and the gelatin during the coating process.

Following coating as just described, and chilling and setting of the coated compositions on the support in a conventional manner, the coated product is dried to a desired equilibrium moisture content of, e.g., 1 to 4 percent water, and stored until needed. During the drying process, the hardening agent will diffuse upwardly through the supervening gelatin containing layers and being the forehardening process. As is known, this process may continue after the equilibrium moisture content is reached, and during storage.

Having thus described the invention, what is claimed is:

1. The process of manufacturing a forehardened photographic product, comprising the steps of coating a plurality of superposed liquid layers on a moving web of material comprising a base for the product, in which a first layer adjacent the base comprises a solution of a diffusible hardener free of gelatin, a second layer adjacent said first layer is initially free of any hardener and polymeric materials cross-linkable by the hardener, and at least a third layer contains a polymer cross-linkable by the hardener, and drying said coated layers while said hardener diffuse through said layers to cross-link said polymer in said third layer.

2. The process of making a forehardened photographic product, comprising the steps of coating a base with a plurality of superposed layers of aqueous compositions, a first of said layers contacting said base and comprising an aqueous solution of a diffusible hardener, a second of said layers contacting said first layer and being initially free of hardener, and at least a third of said layers containing gelatin, said first and second layers being free of gelatin, and drying said coated layers while said hardener diffuses through said layers to harden said gelatin.

3. The process of making a forehardened photographic product, comprising coating a moving web with a plurality of superposed liquid compositions each comprising a major proportion of a volatile solvent, a first of said compositions containing a diffusible cross-linking agent, being free of gelatin, and being coated directly on said web, a second of said compositions being free of said cross-linking agent and free of gelatin, said second composition being coated on said first composition, and a third of said compositions comprising gelatin, and drying said coated web to remove the major proportion of said solvent while said cross-linking agent diffuses through said layers to foreharden said gelatin.

4. The process of claim 3, in which said cross-linking agent is succinaldehyde, and said solvent is water.

5. The process of claim 4, in which said first composition contains a cross-linkable shear-thinning thickening agent in a concentration too low to be appreciably cross-linked during the coating process.

6. The process of manufacturing a forehardened photographic product comprising the steps of coating a plurality of superposed liquid layers on a moving web of material comprising a base for the product, in which a first layer adjacent the base comprises a solution of a diffusible hardener free of polymeric materials cross-linkable by the hardener, a second layer adjacent said first layer is initially free of any hardener and polymeric materials cross-linkable by the hardener, and at least a third layer contains a polymer cross-linkable by the hardener, and drying said coated layers while said hardener diffuses through said layers.

7. The process of making a forehardened photographic product, comprising coating a moving web with a plurality of superposed liquid compositions each comprising a major proportion of a volatile solvent, a first of said compositions containing a diffusible cross-linking agent, being free of gelatin, being free of a sufficient quantity of cross-linkable polymeric material other than gelatin to be appreciably cross-linked during coating, and being coated directly on said web, a second of said compositions being free of said cross-linking agent and free of polymeric materials cross-linkable by said cross-linking agent, said second composition being coated on said first composition, and a third of said compositions comprising a polymeric material cross-linkable by said cross-linking agent, and drying said coated web to remove the major proportion of said solvent while said cross-linking agent diffuses through said layers to cross-link said polymeric material in said third composition.

* * * * *